Figure 1:
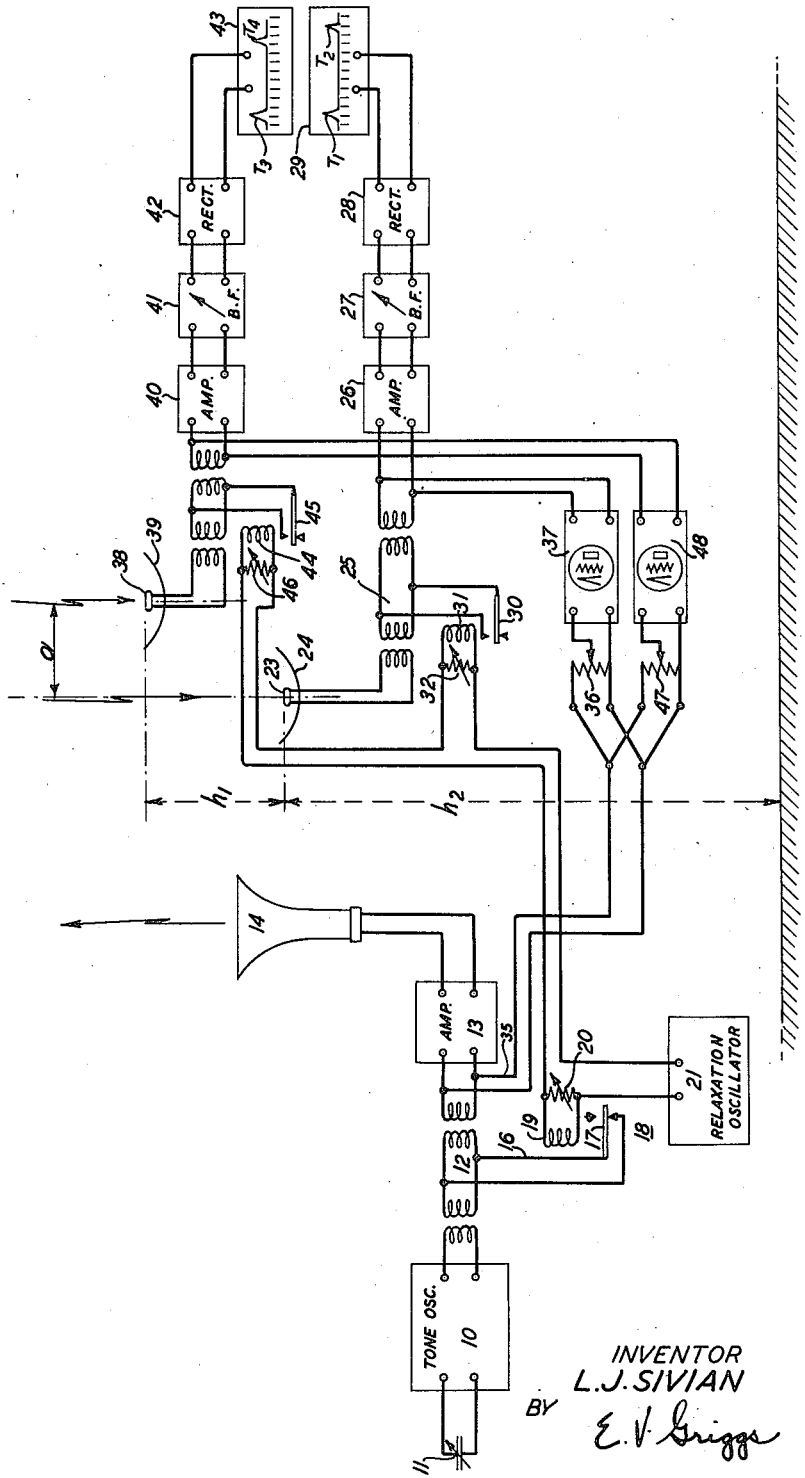

May 9, 1950 L. J. SIVIAN 2,507,121
EXPLORATION OF TROPOSPHERE STRATIFICATION
Filed June 27, 1946 3 Sheets-Sheet 1

INVENTOR
L.J.SIVIAN
BY
E.V.Griggs
ATTORNEY

Patented May 9, 1950

2,507,121

UNITED STATES PATENT OFFICE 2,507,121

EXPLORATION OF TROPOSPHERE STRATIFICATION

Leon J. Sivian, Summit, N. J., assignor to Bell Telephone Laboratories, Incorporated, New York, N. Y., a corporation of New York Application June 27, 1946, Serial No. 679,615

3 Claims. (Cl. 177—352)

This invention relates to exploration of troposphere stratification and more particularly to methods of and systems for exploration of tropospheric and atmospheric conditions by means of compressional waves.

It has been found that discontinuities in the physical properties of the atmosphere may give rise to reflections of compressional waves, the intensity of which and the echo time interval of which may indicate the nature of the discontinuity and measure its distance. Methods and apparatus for such explorations are disclosed and claimed in the copending application of G. W. Gilman, Serial No. 676,611, filed June 14, 1946, for Exploration of troposphere stratification.

An object of the present invention is to free indications received in compressional wave troposphere exploration from interfering effects such as disturbing horizontally propagated sounds or horizontally propagated reflections of the exploring energy.

Another object of the invention is to enable discrimination against receipt of impulses arriving from higher regions of the atmosphere but not vertically propagated.

A principal object of the invention is to enable a definite determination that an incoming compressional wave is being propagated in a vertical downward direction.

In accordance with one embodiment of the invention a compressional wave source is so designed and mounted as to propagate compressional waves in a highly directive beam aimed at the region to be explored which, in the particular embodiment of the invention disclosed, is the vertically upward troposphere region. The compressional waves coursing upward are sent out in short pulses which are partially reflected at any discontinuity to return in a vertically downward direction to the region of the compressional wave source. Two compressional wave receivers, also highly directive in their response to compressional waves, are so oriented as to receive only vertically downwardly propagated energy and are located in the sound shadow of the directive compressional wave source at the transmitter so as to receive no energy directly propagated therefrom. These receivers are also substantially aligned in a vertical direction with the lowermost sufficiently above the ground to avoid ground effects upon the horizontally propagated waves and with the uppermost at a fixed distance above the lower sufficiently great so that there is a cleancut separation of the arrival times of a compressional wave propagated vertically downward. However, horizontally propagated interfering compressional waves arriving either from an extraneous source or by complex paths from the local compressional wave transmitter will be simultaneously received by the two receivers with substantially equal intensity. The two receivers may have their outputs connected in opposition to the input of an oscilloscope so that the effects upon the oscilloscope of horizontally propagated waves will be substantially annulled.

Figure 2:
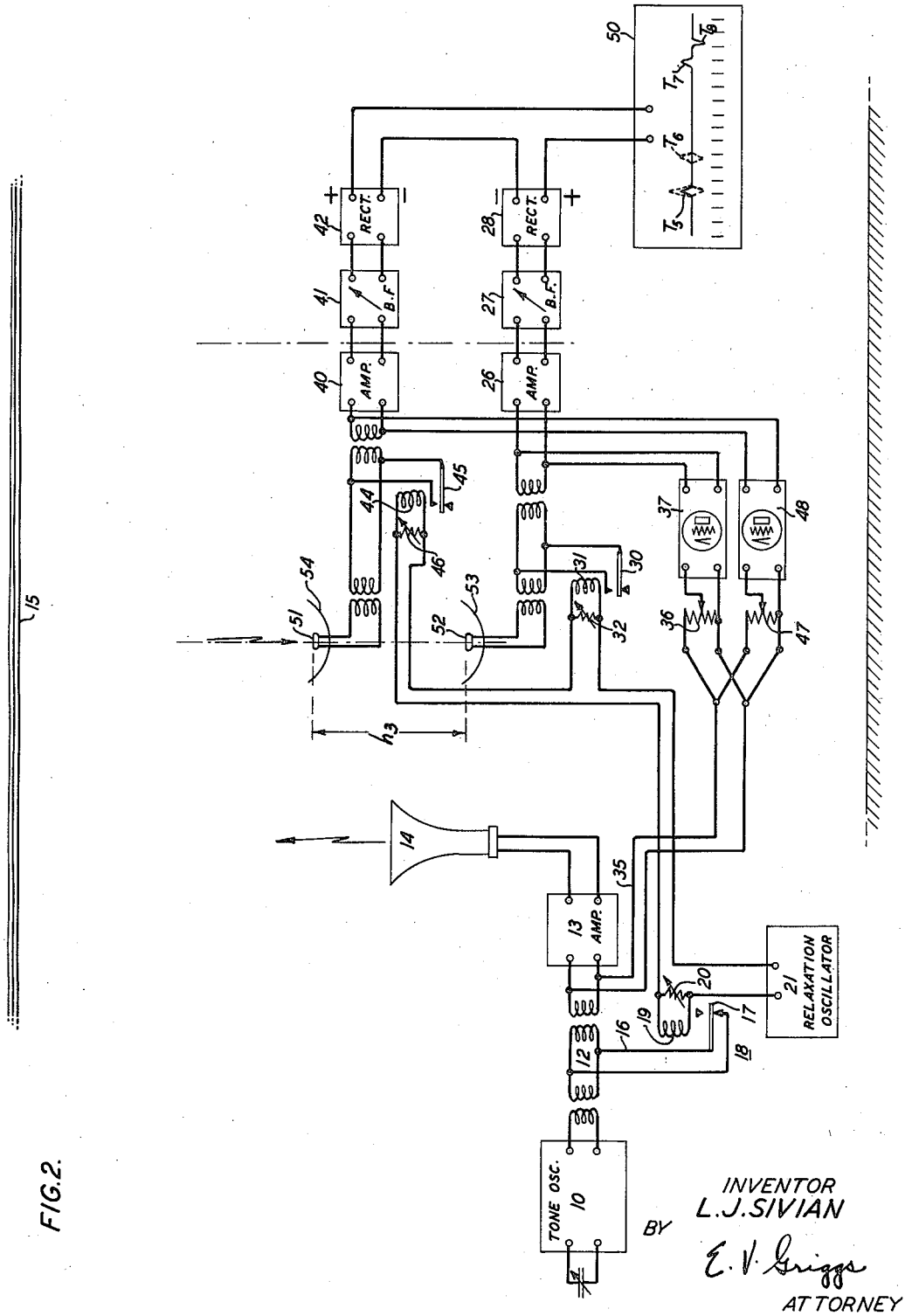
Figure 3:
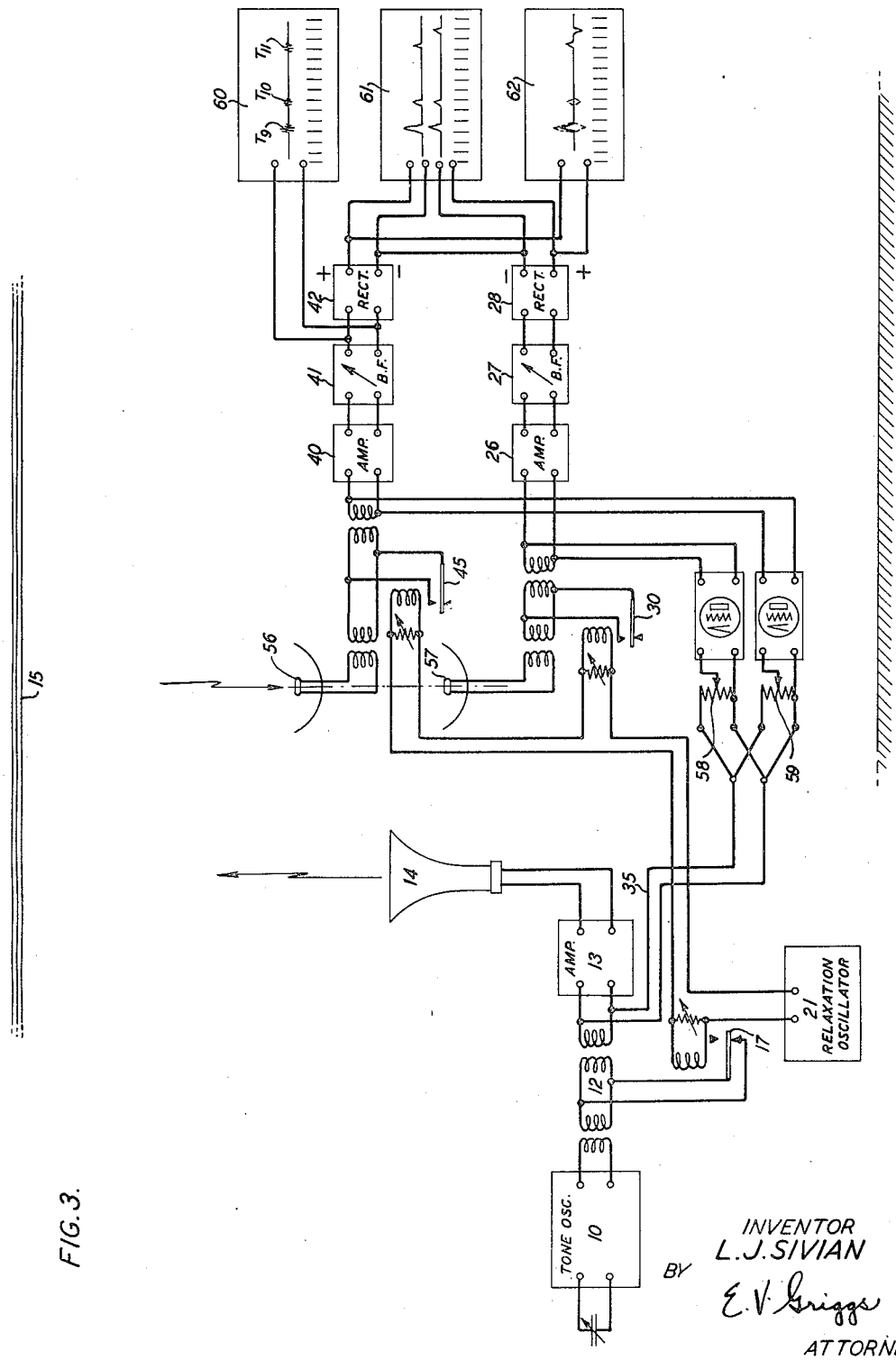

In the drawing, Fig. 1 represents diagrammatically the circuit of one embodiment of the invention and Figs. 2 and 3 show the circuits of alternative embodiments.

Referring to Fig. 1 the variable frequency tone oscillator 10 is provided with a frequency varying element such as variable capacity element 11 and is connected through the pulsing control loop 12 to the input circuit of the amplifier 13 which feeds amplified tone current to the vertically upwardly directed loudspeaker 14 to send sound energy toward the stratum or tropospheric discontinuity 15 directly overhead. The pulsing control loop 12 is normally short-circuited through the shunt path 16 extending through the armature 17 of a relay 18 having a winding 19 shunted by a variable resistor 20 to enable adjustment of the operating and release current of the relay. A relaxation oscillator 21 has a space current path which passes through the winding 19 and resistor 20 and the periodicity of the oscillator 21 is adjusted in any well-known manner to accord with the desired periodicity of the recurring pulses of sound energy to be propagated upward to stratum 15. The length of each pulse will depend upon the time during which relay armature 17 is separated from its lower contact which in turn depends upon the adjustment of relay 18 and its shunt resistor 20 and also upon the magnitude of the peak of space current of the relaxation oscillator.

At a short distance from the transmitter loudspeaker 14, a sound pickup device or microphone 23 is mounted at the focal point of a paraboloidal sound reflector 24 which is highly selective for compressional waves propagated vertically downward and which lies in the sound shadow of the horn of the loudspeaker 14. The microphone 23 which may be of the electrodynamic or any other suitable type responds to incoming compressional waves and supplies electric currents of corresponding frequency and amplitude over the connecting loop 25 to the input circuit of amplifier 26, the output circuit of which is connected through the variable band filter 27 to a rectifier 28 which is connected to a string oscillograph 29 to transmit thereto impulses corresponding to rectified pulses of incoming compressional wave energy. Across the loop 25 is connected a short-circuiting path including the normally released armature 30 actuated by relay winding 31 which with its sensitivity adjusting variable shunt resistor 32 is connected in series with the relay winding 19 in the space current path of relaxation oscillator 21. Accordingly, as the relay 18 operates to permit a pulse of tone current to pass from tone oscillator 10 to amplifier 13 and loudspeaker 14 the winding 31 is energized to actuate armature 30 short-circuiting loop 25 to protect amplifier 26 from overload that might result from any casual direct energization of the microphone 23 or the receiving circuit thereof by energy from loudspeaker 14 or its circuits. The armature 30 should close the short-circuiting path before the directly propagated energy reaches microphone 23 and the path should stay closed until the impulse from loudspeaker 14 has terminated. This may be effected by proper design and relative adjustments of the two relays at 19 and 31 and their variable shunt resistors but in practice a physical separation of sufficient magnitude between the loudspeaker 14 and microphone 23 may be used to enable the actuation of the protecting armature 30 before the compressional wave has time to traverse the physical space between loudspeaker 14 and microphone 23. The relay 31 should release a little time after the termination of receipt of directly propagated energy so that the receiving circuit of the microphone 23 may be prepared for incoming compressional wave energy arriving from the zenith in consequence of reflection of vertically propagated waves from overhead atmospheric discontinuities. The reflected energy so received may be amplified by amplifier 26 and subjected to a filtering action by variable band-pass filter 27 to select a single tone or a narrow frequency band which, after rectification by rectifier 28, is utilized to actuate the string oscillograph or other wave recording device 29. In order to provide a marking pulse to denote the time of initiation of the upward compressional wave beam from loudspeaker 14 a path 35 leads from the input of the transmitter amplifier 13 to a potentiometer 36 to which an amplifier 37 is connected. The amplifier 37 has an output circuit leading to the input of receiver amplifier 26 and serves as an asymmetric translator to preclude transmission from the input circuit of amplifier 26 to the input circuit of amplifier 13. It follows that the actuation of relay 18 to permit a pulse of tone energy to energize loudspeaker 14 also permits a marking pulse to pass by way of path 35, potentiometer 36 and asymmetric device 37 to the receiving amplifier 26 to be filtered, rectified and finally recorded at oscillograph 29 as the pip $T_1$. During this time and for a short time thereafter the output path of microphone 23 remains short-circuited. When the compressional beam energy from loudspeaker 14 reaches discontinuity 15, a portion of it is reflected and impinges upon microphone 23 to cause the recording of the pip $T_2$. The oscillograph record may be calibrated as indicated so that the time incidence of each pip is shown as well as the time interval between the pips. If desired, the calibration may be in terms of compressional wave travel so as to enable one to read directly the distance to the discontinuity 15 represented by the spacing of the pips $T_1$ and $T_2$.

A system of the general type which has been described is disclosed in the G. W. Gilman application, Serial No. 676,611 to which reference previously has been made. However, the present invention involves an improvement upon that system to enable discrimination against energy arriving from unwanted sources and directions and to preclude giving a false or deceptive indication. For this purpose the receiving station may be provided with a second microphone 38 located slightly to one side of microphone 23 by a lateral distance $a$ so as not to interfere with vertically downwardly directed energy to be received by microphone 23. The microphone 38 is mounted at an elevation substantially higher than microphone 23 by an altitude difference $h_1$ sufficient to cause a clearly distinguishable advance in arrival time of a reflected pulse from discontinuity 15. The microphone 38 is provided with a paraboloidal reflector 39, the assemblage being highly directive to receive vertically downwardly propagated compressional waves and to discriminate against compressional waves arriving from other directions. The circuits and apparatus associated with microphone 38 may be otherwise identical with those connected to microphone 23.

It will be apparent that when the marking pulse is transmitted over path 35 it will divide, part going to potentiometer 47, asymmetric device 48, the input of amplifier 40, band filter 41 and rectifier 42 to produce a pip $T_3$ on the record of string oscillograph 43 which will be in time coincidence with pip $T_1$ on the record of oscillograph 29. At that time relay winding 44 is operated to close the protective shunt path through its armature 45. When the reflection from discontinuity 15 reaches microphone 38 the protective short circuit has already opened so that there is recorded a pip $T_4$ which will occur at a time in advance of pip $T_2$ corresponding substantially to the transit time for compressional waves over the distance $h_1$. This assures the observer that the indications are from a vertically downwardly propagated wave. If, however, horizontally propagated noise, as from a gun shot, arrives at microphones 23 and 38 it will produce pips which are in time coincidence or at least differ only by the transit time over distance $a$ which is made the minimum possible which will avoid vertical alignment of the two reflectors 24 and 39.

By varying the filters 41 and 27 the reflecting action of the troposphere may be explored for different frequency energies in turn.

The tone source 10 emits a rectangular envelope pulse of oscillations which may lie in the audible range or may even be supersonic. The choice of the pulse duration while not critical involves several factors. The pulse must be long enough for the time constants of the transmitting and receiving circuits to admit of a pulse envelope which is essentially flat-topped with vertical sides. As the pulse duration is increased the minimum height from which a reflection may be received and observed without interference from the sender decreases. Also, as the pulse duration increases the ratio of the desired reflected pulse to the backward scattering of sound by the great mass of inhomogeneities in the air decreases. For a frequency of 2000 cycles per second the pulse duration may be from 30 to 45 milliseconds; for a frequency of 6000 cycles per second it may be 10 to 15 milliseconds.

The system of Fig. 2 involves a transmitter identical with that of Fig. 1. At the receiver, however, the rectified output pulses are impressed in opposing relation upon the input circuit of the single string oscillograph 50. The compressional wave receiving system also differs from that of Fig. 1 in that the microphones 51 and 52 are vertically aligned so that the paraboloidal reflector 53 is in the shadow of the reflector 54. However, if the separation in elevation $h_3$ is sufficient vertically downwardly propagated compressional wave energy will reach microphone 52 by diffraction.

In operation, the elements of Fig. 2 function as the similarly designated elements of Fig. 1. Actuation of relay 18 sends a pulse of tone current from source 10 to loudspeaker 14 and a simultaneous marking pulse to the path 35. However, the potentiometers 36 and 47 are adjusted in conjunction with their respective amplifiers 37 and 48 to transmit pulses of different magnitudes and the outputs of rectifiers 28 and 42 are poled in opposition to cause the rectified pulses to be of opposing sign, as indicated by the broken lines at $T_5$, to yield a resultant marking pulse as indicated in the solid line. Any simultaneously received energy coming from a horizontal direction reaches microphones 51 and 52 simultaneously to produce opposing pulses, as at $T_6$, with no resultant indication. However, the echo or return pulse received from vertically aloft arrives first at microphone 51 to produce pulse $T_7$ and, subsequently, at microphone 52 to produce the reversely directed pulse $T_8$. The spacing of pulses $T_7$ and $T_8$ gives definite assurance that they are occasioned by an echo from the troposphere.

Fig. 3 combines the indicating expedients of both Fig. 1 and Fig. 2 at the receiver. As in the case of Fig. 2, similar elements are similarly designated and the vertically aligned positioning of microphones 56 and 57 is like that of Fig. 2 as is also the adjustment of potentiometers 58 and 59. Three oscillographs are employed. The first indicated at 60 is connected to the input circuit of rectifier 42 and, accordingly, indicates marking oscillations, extraneous oscillations and troposphere echo oscillations by tone frequency oscillograms at $T_9$, $T_{10}$ and $T_{11}$, respectively. A second oscillograph 61 is provided with two strings to produce two separate oscillograms in connection with a single scale thus combining in a single instrument the functions of the two oscillographs 29 and 43 of Fig. 1 to show by comparison the simultaneous arrival of the marker pulse and the earlier arrival of the echo pulse at the more elevated microphone. A third oscillograph 62 is in all respects identical with the oscillograph 50 of Fig. 2. It is thus possible to see just how far away is the overhead discontinuity of the troposphere and to ascertain if extraneous pulses are being received from horizontal or other undesired directions.

What is claimed is:

1. A system for producing an indication of impedance discontinuities in the atmosphere which comprises a source of ultra-sonic frequency electric energy, a directive translating device to convert said electric energy to compressional wave energy and to direct said wave energy vertically toward the troposphere in a narrow beam substantially symmetrically disposed about a vertically directed axis, a pair of receiving devices to receive reflected portions of said vertically transmitted compressional wave energy and to translate said received energy into electrical energy, said receiving devices each having a highly directive lobe of energy reception substantially symmetrically disposed about an axis perpendicular to the face of each of said devices, said devices being disposed one above the other in such space separation that vertically reflected energy is received by them in perceptible sequence, amplifying means and unilaterally-conducting rectifying means connected in series to the output of each of said receiving devices, an oscilloscope responsive to an applied electromotive force to produce a time-related visual indication of said applied electromotive force, circuit means interconnecting the outputs of said rectifying devices in opposed polarity to the same terminals on said oscilloscope, means for periodically delivering energy from said source to said directive translating device for transmission toward the troposphere and means to produce on said oscilloscope a visual indication of the time occurrence of each energy transmission toward said troposphere, said means comprising circuit means interconnecting said source of electric energy and at least one of said amplifying and unilaterally-conducting rectifying means to deliver to said oscilloscope a pulse of unidirectional electromotive force at the time of each energy transmission toward the troposphere.

2. A system for exploring the troposphere which comprises a periodically activated source of electric wave energy, a compressional wave transmitter connected thereto and having a highly directive lobe of energy distribution to direct said energy toward the troposphere in a narrow beam substantially symmetrically disposed about the longitudinal axis of said beam, a pair of compressional wave receivers each having a highly directive lobe of energy reception, said lobe being substantially symmetrically disposed about the longitudinal axis thereof, said receivers being positioned one above the other in space separation with the lobe axis of each aligned and substantially parallel to the lobe axis of said transmitter, such that the incidence upon them of energy reflected from the troposphere is in perceptible sequential relation, amplifying and translating means individual to and connected to each of said receivers to convert received compressional wave energy into a unidirectional electromotive force, indicating means operative in response to an applied electromotive force to produce a visual indication of the time of application of said force with respect to a reference time condition, circuit means connecting the output of each of said translating means to said visual indicating means in opposed polarity, and circuit means of unequal signal level interconnecting said periodically-activated source of wave energy and said amplifying and translating means to deliver to said indicating means unequal-amplitude polarity-opposed pulses of said electric wave energy at the time of each transmission of compressional wave energy toward the troposphere by said directive transmitter.

3. A system for tropospheric explorations which comprises a source of electric wave energy, a transmitter connected thereto to translate and transmit said electric wave energy in a highly directive lobe of compressional wave energy substantially symmetrically disposed about the longitudinal axis of said lobe, means for periodically activating said electric source for intermittent short periods, a pair of compressional wave receivers each having a highly directive lobe of energy reception in substantially symmetrical distribution about the longitudinal axis of said lobe, said receivers being located vertically one above the other in space separation such that the lobe axis of each is in substantial alignment and parallel to the lobe axis of said transmitter and vertically-reflected energy incident thereon is received in perceptible sequential relation, unidirectionally conducting and translating means connected to each of said receivers to convert said received energy into a pair of unidirectional electromotive forces, indicating means responsive to an applied electromotive force to produce a visual indication of the time of application thereof with reference to a reference time, circuit means connecting the outputs of said translating means to said oscilloscope in opposed polarities, and circuit means of unequal signal level interconnecting said periodically activated source and said translating means to produce a reference deflection on said oscilloscope at the instant of each energy transmission toward the troposphere.

LEON J. SIVIAN.

REFERENCES CITED

The following references are of record in the file of this patent:

UNITED STATES PATENTS

| Number | Name | Date |
| --- | --- | --- |
| Re. 17,242 | McCollum | Mar. 19, 1929 |
| 1,312,809 | Scribner et al. | Aug. 12, 1919 |
| 2,032,893 | Settegast et al. | Mar. 3, 1936 |
| 2,087,702 | Peters | July 20, 1937 |
| 2,215,297 | Owen | Sept. 17, 1940 |
| 2,376,730 | Steinhoff | May 22, 1945 |
| 2,408,001 | Shimek et al. | Sept. 24, 1946 |
| 2,431,317 | Earp et al. | Nov. 25, 1947 |
| 2,438,526 | Waterman | Mar. 30, 1948 |

FOREIGN PATENTS

| Number | Country | Date |
| --- | --- | --- |
| 367,935 | Germany | Oct. 18, 1921 |